United States Patent
Gila et al.

[11] Patent Number: 5,861,352
[45] Date of Patent: Jan. 19, 1999

[54] SUPPORTED METALLOCENE CATALYST FOR OLEFINS (CO)POLYMERIZATION

[75] Inventors: Liliana Gila; Antonio Proto, both of Novara; Evelina Ballato, Omegna; Diego Vigliarolo; Gabriele Lugli, both of Milan, all of Italy

[73] Assignee: Enichem S.p.A., Milan, Italy

[21] Appl. No.: 593,523

[22] Filed: Jan. 30, 1996

[30] Foreign Application Priority Data

Feb. 1, 1995 [IT] Italy ................... MI95A0167

[51] Int. Cl.$^6$ .............. B01J 31/00; B01J 37/00; C08F 4/02; C08F 4/60
[52] U.S. Cl. ............ 502/155; 502/103; 502/104; 502/107; 502/108; 502/117; 502/151; 502/152; 502/158; 556/52; 556/53; 526/160; 526/943
[58] Field of Search ................. 502/104, 108, 502/151, 153, 103, 117, 155, 158

[56] References Cited

U.S. PATENT DOCUMENTS

| | | | |
|---|---|---|---|
| 5,122,491 | 6/1992 | Kioka et al. ................ | 502/103 |
| 5,202,398 | 4/1993 | Antberg et al. ............. | 502/120 |
| 5,252,529 | 10/1993 | Ueda et al. ................. | 502/108 |
| 5,466,766 | 11/1995 | Patsidis et al. ............ | 502/104 |
| 5,529,966 | 6/1996 | Luciani et al. ............ | 502/103 |

FOREIGN PATENT DOCUMENTS 0 628 566  12/1994  European Pat. Off. .
5-17515  1/1993  Japan .

OTHER PUBLICATIONS

R. Morrison and R. Boyd, "Organic Chemistry", 3ed, Allyn and Bacon, New York, pp. 456–458, 1976.

Macromolecular Rapid Communications, vol. 15, No. 2, pp. 139–143, Feb., 1994, Kazuo Soga, et al., "Highly Isospecific SiO$_2$ –Supported Zirconocene Catalyst Activated by Ordinary Alkylaluminiums".

Macromolecular Symposia, vol. 89, No. 1297b, pp. 249–258, Jan. 1995, Kazuo Soga, et al., "Highly Isospecific Immobilized Zirconocene Catalysts Supported on Chemically Modified SiO$_2$".

Macromolecular Chemistry and Physics, vol. 195, No. 10, pp. 3347–3360, Oct. 1994, Kazuo Soga, et al., "Polymerization of Propane with Highly Isospecific SiO$_2$–Supported Zirconocene Catalysts Activated with Common Alkylaluminiums".

Primary Examiner—Mark L. Bell
Assistant Examiner—J. Pasterczyk
Attorney, Agent, or Firm—Oblon, Spivak, McClelland, Maier & Neustadt, P.C.

[57] ABSTRACT

A solid catalyst component for the polymerization and copolymerization of ethylene and alpha- olefins, containing a metallocene supported on an inorganic solid carrier constituted by a porous silicon oxide, the supported metallocene having the formula (I):

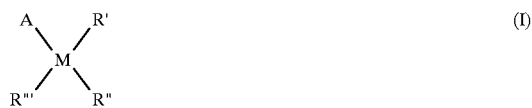

(I)

wherein M is a group of metal, R' and R" are dialkylamide groups, R'" has the same definition as R' or is a cyclopentadienyl consisting ligand, and A is an anion containing an $\eta^5$-cyclopentadienyl ring coordinated to metal M, and wherein a carbon atom of the $\eta^5$-cyclopentadienyl ring of anion A is covalently bonded to the surface of the porous inorganic solid carrier.

29 Claims, No Drawings

SUPPORTED METALLOCENE CATALYST FOR OLEFINS (CO)POLYMERIZATION

The present invention relates to a supported metallocene catalyst for olefins (co)polymerization.

More particularly, the present invention relates to a suitable catalyst for ethylene and/or alpha-olefins polymerizing or (co)polymerizing, consisting of a metallocene supported on an inorganic solid carrier and an aluminoxane, and to the use of said catalyst in ethylene and/or other α olefins (co)polymerization. The present invention furthermore relates to a method for preparing said supported metallocene complex.

It is generally known in the art that ethylene or, in general, alpha-olefins, can be polymerized by means of low or medium pressure processes with catalysts based on a transition metal, generally known as Ziegler-Natta catalysts. Catalysts useful for such a purpose are generally formed by a transition metal compound (elements belonging to groups from IV to VIII of the Periodic Table of Elements), mixed with an organometallic compound or a hydride of elements belonging to groups from I to III of said Periodic Table, operating in suspension, in solution or also in the absence of solvents or diluents. For such known technique, reference is made to the disclosure by J. Boor, "Ziegler-Natta Catalysts and Polymerization", Academic Press, New York (1979).

A particular class of catalysts active in olefins polymerization is constituted by the combination of an organic aluminum oxy-derivative (commonly referred to as an "aluminoxane") with an $\eta^5$-cyclopentadienyl derivative of such a metal as titanium, zirconium or hafnium (Group IVA), also commonly referred to as a "metallocene", which can be defined, in its most general form, by the following formula (I):

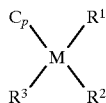

wherein:
- —M represents a metal belonging to Group IVA of the Periodic Table of Elements, formally in its +4 oxydation state, and preferably is titanium or zirconium;
- —$R^1$ and $R^2$ represent, each independently, a group having anionic character such as, for example, a hydride, a halide, a phosphonate or sulfonate anion, an alkyl or alkoxy group, an aryl or aryloxy group, an amide group, a silyl group, and so forth;
- —$C_p$ independently represents a ligand moiety of $\eta^5$cyclopentadienyl type and generally is selected from $\eta^5$-cyclopentadienyl, $\eta^5$-indenyl, $\eta^5$-fluorenyl and their variously substituted derivatives;
- —$R^3$ can have, independently from the nature of the other substituents, one of the meanings of both $C_p$ ligand and $R^1$ or $R^2$ groups.

Particularly interesting resulted to be, in the known art, also "bridge" metallocenes, wherein two Cp groups, which may be equal or different from each other, are covalently bonded by a bridge bond which usually comprises also other carbon atoms or heteroatoms. For a known technique for the preparation of the above said compounds, reference is made to the disclosure by H. Sinn, W. Kaminsky, in Adv. Organomet. Chem., volume 18 (1980), page 99 and U.S. Pat. No. 4,542,199.

These catalysts show a high catalytic activity, and they are capable of producing polymers with the desired characteristics as a function of the particular catalytic composition which is used and of the olefin, or olefins mixture, submitted to polymerization. See, for example, among the very numerous published papers relating to this topic, the disclosures of U.S. Pat. Nos. 4,530,914, 4,935,474, 4,937,299 and 5,001,205, and of European Patent Applications having publication numbers 35,242, 318,049, 384,171 and 387,609.

Particular metallocenes having a structure comprising only one $\eta^5$-cyclopentadienyl ligand and ligands of alkylamide (—$NR_2$) type, are described in European Patent Application No. 476,671.

Unfortunately, notwithstanding their numerous merits, also metallocene based catalysts suffer from several drawbacks, such as, for example, that polyolefins with a too fine granulometry are obtained. Another problem which is reported in the known art derives from the low stability of metallocenes, in particular titanium metallocenes, when they are used as such in high pressure (>500 bar) and high temperature (about 200° C.) polymerization processes. A further drawback is the practical impossibility of using metallocenes as such in polymerization processes in gas phase. Said processes are used more and more frequently in industry, because they allow very high yields to be obtained and allow the polymer to be recovered from the reactor by means of a simplified technology. However, the polymerization catalysts based on metallocenes can generally be used in a liquid means and it is not possible to use them in that form in the gas phase processes.

In order to solve, at least partially, the above said drawbacks, the prior art proposed to support the metallocenes active in polymerization on suitable solid carriers which are capable of fixing the complex while retaining substantially unchanged, or possibly increasing, the initial activity and selectivity values. The frequently used carriers for such a purpose are constituted by inorganic porous oxides such as silica, alumina and aluminosilicates, or can be polymeric substrates such as, for example, polystyrene.

The so obtainable polymerization catalysts are thus substantially constituted by a solid component comprising the supported metallocene, and by an aluminum organic compound which, usually, is again an aluminoxane.

Methods for preparing such supported metallocenes known from literature comprise simply contacting, usually in a liquid medium, the porous carrier with the metallocene, as reported, for example, in U.S. Pat. No. 5,122,491.

Although the so prepared supported catalyst make it possible some of the previously mentioned drawbacks to be at least partially prevented, however still considerable problems remain to be solved in order to optimize the use of metallocenes in olefin industrial polymerization, such as, for example, the fact that, during polymerization, the supported metallocene can get released, at least partially, from the carrier, thus acting as a homogeneous catalyst which produces a polymer endowed with undesirable characteristics. The final product of the polymerization can thus result inhomogeneous and with a high content of fine powders.

More frequently, the methods for obtaining supported metallocenes active in olefins polymerization comprise treating the carrier with methylaluminoxane, before that said support is brought into contact with metallocene, as reported, for example, in European Patent Application Nos. EP-A-442 725 and EP-A-516 458.

However, the so obtained solid components do not yet allow very satisfactory catalytic activities to be obtained, which can be compared to those obtainable both with analogous metallocenes in homogeneous phase, and the traditional heterogeneous Ziegler-Natta catalysts. Furthermore, in such solid components obtained by first supporting aluminoxane and then metallocene, in practice, during polymerization, the Al/M ratio cannot be modified, with consequent process operating limitations.

Still considering the purpose of obtaining solid components based on heterogeneous metallocenes, it was furthermore proposed in the prior art to carry out a prepolymerization with formation of a polymeric powder containing the catalyst, followed by the actual polymerization such as, for example, in the already cited Patent Application EP-A-442 725. However, also in such cases, the catalyst productivity is not completely satisfactory, besides the fact that a prepolymerization step is required, which necessarily increases investment and management costs of such processes implementation at industrial level.

In a later approach to the development of catalysts based on supported metallocenes, researchers tried to chemically bond the $\eta^5$-cyclopentadienyl ligand to the inorganic carrier. For such a purpose, for example, Japanese Patent Application publication No. 5-17515 teaches treating powder silica with dimethyldichlorosilane, and subsequently reacting it with a hydroxyalkyl compound the molecule of which contains two cyclopentadienyl rings capable of subsequently forming a metallocene complex with a titanium or zirconium atom. However, no evidence is reported of the formation of the above said metallocene chemically bonded to the inorganic carrier, and, furthermore, the proposed method for carrying out the supporting appears to be particularly difficult and expensive, without offering any particular advantages as compared to other supported metallocenes known from the prior art.

In U.S. Pat. No. 5,202,398 a supported metallocene is disclosed, which is obtained by reacting an inorganic oxide with a metallocene having a cyclopentadienyl ring functionalized with an alkoxysilane group. Also in such a case, however, no experimental evidence is reported with regard to the selective formation of a chemical bond between the cyclopentadienyl group and the carrier. Furthermore, the method disclosed in that document requires the preliminary preparation of specific functionalized metallocenes which do not allow a satisfactory versatility to be obtained in order to meet the different requirements of polyolefins industry.

Thus, the strong need continues to remain of improving the characteristics of the supported metallocenes suitable for olefins polymerization, in order to overcome the previously evidenced drawbacks.

It was found now by the present Applicant that a new class of supported metallocenes obtainable by means of a simple and cheap process, are capable, when they are in combination with an organic aluminum oxyderivative compound, of polymerizing olefins without causing the above mentioned drawbacks.

In particular, it was found that it is possible to support groups or molecules having a metallocene structure on particular oxides, by means of a simple and effective process comprising anchoring a cyclopentadienyl ring directly onto the surface of said oxides.

It was furthermore found that such supported metallocenes, besides being obtained by means of a simple and easy to carry out process, are relatively stable and can be used as high activity catalysts in olefins polymerization, when combined with an aluminoxane.

Thus, a first subject-matter of the present invention is a solid component of a catalyst for ethylene and alpha-olefins (co)polymerization comprising a metallocene supported on an inorganic solid carrier constituted by a porous oxide of a metal M', said supported metallocene having the following Formula (I):

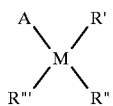

wherein:
- M represents a metal selected from titanium, zirconium or hafnium;
- A is an anion containing an $\eta^5$-cyclopentadienyl ring coordinated to metal M;
- R', and R" represent, each independently, a substituent group selected from a hydrogen or halogen atom, a $C_{(1-8)}$-alkyl group, a $C_{(3-12)}$-alkylsilyl group, a $C_{(5-8)}$-cycloalkyl group, a $C_{(6-10)}$-aryl group, a $C_{(1-8)}$-alkoxy group, a $C_{(2-10)}$-dialkylamide group and a $C_{(4-20)}$-alkylsilylamide group;
- R''' represents a substituent group of the same nature as of the preceding R' and R" groups, selected independently from them, or a second anion containing an $\eta^5$-cyclopentadienyl ring coordinated to metal M;

characterized in that a carbon atom of the $\eta^5$-cyclopentadienyl ring of A anion is covalently bonded to metal M' of the surface of said porous inorganic solid.

The above said metallocene can be advantageously prepared by a process also constituting a subject-matter of the present invention, comprising chlorinating the surface of the inorganic carrier oxide, and, subsequently, reacting the latter with a salt of formula M"A, wherein M" is an alkali metal, and preferably is sodium or lithium, and, finally, reacting the so obtained functionalized solid carrier with a Ti, Zr or Hf compound.

A further subject-matter of the present invention is an olefins polymerization catalyst obtained by contacting the above said solid component constituted by a supported metallocene, with an organic aluminum oxyderivative compound, preferably an aluminoxane, as well as the olefins polymerization process carried out in the presence of said catalyst.

Further subject-matters of the present invention will become clear from the following disclosure and examples.

As previously defined, according to the present invention, R' and R" groups of Formula (I) can represent, each independently, a hydrogen atom or a halogen atom, such as chlorine or bromine, a $C_{(1-8)}$-alkyl group, such as, for example, methyl, ethyl, butyl, isopropyl, isoamyl, octyl, benzyl, a $C_{(3-12)}$-alkylsilyl group such as, for example, trimetylsilyl, triethylsilyl or tributylsilyl, a cycloalkyl group such as cyclopentyl or cyclohexyl, a $C_{(6-10)}$-aryl such as, for example, phenyl or toluyl, a $C_{(1-8)}$-alkoxy group such as, for example, methoxy, ethoxy, iso- or sec-butoxy, or, still furthermore, a $C_{(2-10)}$-dialkylamide or $C_{(4-20)}$-alkylsilylamide, preferably of the type which can be represented by the general formula —NR$^4$R$^5$ wherein R$^4$ and R$^5$ are alkyl groups having from 1 to 4 carbon atoms such as, for example, methyl, ethyl or butyl groups or, in the case of alkylsilylamides, alkylsilyl groups having from 3 to 6 carbon atoms, such as, for example, trimethylsilyl or triethylsilyl.

Preferably, R' and R" groups of Formula (I) represent a dialkylamide group of formula —NR$^4$R$^5$, in particular with R$^4$ and R$^5$ equal to each other.

According to the present invention, the A group in Formula (I) is an anion containing an $\eta^5$-cyclopentadienyl ring which is preferably derived from (formally by extraction of an H$^+$ ion) a cyclopentadiene, indene or fluorene molecule, or from a derivative of one of the above said compounds, in which one or more carbon atom(s) of the molecular backbone (comprised or not in the cyclopentadienyl ring), are substituted by $C_{(1-8)}$-alkyl or silylalkyl groups, or $C_{(6-10)}$-aryl or aryloxy groups, or $C_{(1-8)}$-alcoxy groups. Said A group can also be fused with one or more other aromatic rings such as, for example, in 4,5-benzoindenyl.

Obviously, according to the present invention, in the supported metallocene of Formula (I), at least one carbon atom in the $\eta^5$-cyclopentadienyl ring of the A group is covalently bonded to metal M' which makes a part of the carrier, and thus cannot be substituted by other groups.

According to the present invention, R''' in Formula (I) preferably represents a dialkylamide group.

According to a particularly preferred embodiment of the present invention, R', R'' and R''' groups of Formula (I) all represent dialkylamide groups of formula —NR$^4$R$^5$, preferably equal to one another, such as, for example, dimethylamide or diethylamide.

According to a second preferred embodiment of the present invention, R' and R''' are still dialkylamide groups, as previously defined, and R''' is a second $\eta^5$-cyclopentadienyl group coordinated to metal M, which, similarly to the preferred form for A, is derived from a cyclopentadiene, indene or fluorene molecule, or from one the corresponding derivatives substituted in the rings. However, this second $\eta^5$-cyclopentadienyl group is not directly bonded to the porous carrier constituted by the metal M' oxide. Particularly preferred are, in the latter case, metallocenes of Formula (I), wherein R' and R'' are dimethylamide or diethylamide and R''' is cyclopentadienyl ($C_5H_5$), indenyl ($C_9H_7$) or a (poly)methyl-substituted derivative thereof.

Examples of compounds of Formula (I) which are preferred for the purposes of the present invention are the compounds listed below, which are all intended as having one hydrogen atom on a carbon atom in an $\eta^5$-cyclopentadienyl ring substituted with a covalent bond to a M' atom, preferably Si, of a suitable porous carrier, according to as specified hereinabove.

($\eta^5$-$C_5H_5$)Zr(NEt$_2$)$_3$
($\eta^5$-$C_5H_5$)$_2$Zr(NEt$_2$)$_2$
($\eta^5$-$C_5H_5$)Zr(NMe$_2$)$_3$
($\eta^5$-$C_5H_5$)$_2$Ti(NMe$_2$)$_2$
($\eta^5$-Ind)Zr(NMe$_2$)$_3$
($\eta^5$-Ind)$_2$ZrCl$_2$
($\eta^5$-Ind)HfCl$_3$
($\eta^5$-Flu)ZrCl$_3$
($\eta^5$-$C_5H_5$)$_2$TiCl$_2$
($\eta^5$-$C_5H_5$)$_2$TiMe$_2$
($\eta^5$-Ind)$_2$ZrBz$_2$ The short form of radical names used in the preceding formulae have the following meanings: Me=methyl, Et=ethyl, Bz=benzyl, Ind=Indenyl, Flu=fluorenyl.

Furthermore, also those solid catalyst components which contain two or more metallocenes of Formula (I) mixed with each other bonded to the porous inorganic carrier, fall within the scope of the present invention.

The porous inorganic solid carrier constituted by a metal M' oxide, used as the carrier in the solid catalyst component according to the present invention, preferably is in granular or powder form with an average granulometry comprised within the range of from 0.1 to 500 $\mu$m, preferably comprised within the range of from 5 to 200 $\mu$m. Metal M' is preferably selected from silicon, aluminum, titanium, zirconium, calcium, barium, zinc, magnesium or a mixture of said metals. Typical oxides of this kind are, for example, silica, alumina, aluminosilicates, titanium oxide (TiO$_2$).

Particularly preferred for the purposes of the present invention is silica.

The metal M concentration in the solid catalyst component of the present invention can vary within a wide range as a function of the nature of the carrier and of the process used to support metallocene onto the solid carrier. The metal M concentration (and consequently of the supported metallocene) is advantageously comprised within the range of from 0.1 to 10% by weight, preferably of from 0.5 to 5% by weight, with reference to the solid component.

The solid catalyst component which is the object of the present invention can be advantageously and surprisingly obtained by means of an original process easy to be carried out comprising anchoring a cyclopentadienyl ring (which may be either substituted or not substituted) onto the porous carrier constituted by metal M' oxide, followed by metallocene formation by reaction with a proper metal M compound.

A second object of the present invention therefore is thus a process for preparing the above said supported metallocene of Formula (I), by starting from a porous oxide of a metal M', on the surface of which M'—OH groups are present, which process comprises the following sequential steps:

(a) halogenating said porous oxide until the almost complete replacement of surface —OH groups bonded to metal M' with halogen atoms selected from chlorine and bromine, preferably chlorine, is obtained;

(b) contacting, in an inert liquid medium, the halogenated porous oxide such as from above step (a) with a salt having Formula M''C$_p$, wherein M'' is an alkali metal, preferably Li or Na, and C$_p$ represents a substituted or unsubstituted cyclopentadienyl anion, until the almost complete replacement of halogen atoms is obtained on the surface of said porous oxide by said C$_p$ groups, in which a carbon atom of cyclopentadienyl ring is covalently bonded to an M' atom of porous oxide;

(c) reacting said Cp groups bonded to the surface of said porous oxide with a metal M compound having the following Formula (II):

wherein R', R'', R''' and M have the same meaning as of the corresponding symbols in above Formula (I), and B is a $C_{(1-8)}$-alkyl group, or a $C_{(5-8)}$-cycloalkyl group, or a $C_{(6-10)}$-aryl group, or a $C_{(1-8)}$-alkoxy group, or a $C_{(1-10)}$-dialkylamide group, so as to form the supported metallocene having the above Formula (I).

Preferably, according to the present invention, B is a $C_{(1-10)}$-dialkylamide group. Dialkylamide groups having formula —NR$_1$R$_2$ having the same meaning as previously defined for the compounds of Formula (I) are particularly preferred.

The (a) step of the present process can be carried out according to any of suitable methods known from the prior art for extensively replacing surface —OH groups of porous oxide with chlorine atoms. It can be carried out, for example, according to the method, described in particular for silica chlorination by J. B. Peri in "The Journal of Physical Chemistry", Vol. 70, page 2942 (1966).

The term "almost complete replacement", as used in the present disclosure and in the appended claims, identifies that situation in which the presence of the replaced atoms or groups is no longer detectable by the known instrumental analytical techniques.

Preferably, the (a) step of the instant process can be carried out by reacting a porous oxide of a metal M' such as, for example, silicon, aluminum, titanium, zinc or magnesium, preferably in granular or powder form, with vapours of a chlorinating agent, preferably selected from $CCl_4$, $Cl_2$, $SiCl_4$ and HCl, at a temperature comprised within the range of from 300 to 600° C. and for a long enough time period to carry out the almost complete replacement of —OH groups with chlorine atoms. The vapours of the above said chlorinating agents are preferably mixed with 60–90% by volume of an inert gas such as nitrogen or argon.

The treatment times vary as a function of the oxide type, of the temperature and of the halogen concentration in the vapour, or mixture of inert gas and vapour. Such a concentration is, in general, a function of the vapour pressure of the halogenating agent according to the well-known state equations. The proceeding of the chlorination reaction of the porous oxide can be followed by means of sequential determinations of the residual concentration of surface —OH groups on said porous oxide, for example, by means of infrared spectroscopy as reported in the previously cited paper, until disappearance of the characteristic peak at 3750 nm.

The porous oxides which can be used for the present preparation process generally have a granulometry comprised within the range of from 0.1 to 500 μm, preferably comprised within the range of from 5 to 200 μm, a pore volume comprised within the range of from 1 to 3 ml/g, an available surface area comprised within the range of from 50 to 400 m²/g, preferably comprised within the range of from 100 to 300 m²/g and a concentration of M'—OH groups on their surface comprised within the range of from 0.1 to 2.0 mmol/g, preferably comprised within the range of from 0.4 to 1.0 mmol/g.

Porous oxides which can be used in the (a) step of the instant process preferably are silica, alumina or aluminosilicates. These are all commercially available with the previously listed characteristics of granulometry, surface area and pore volume. Particularly preferred for the purposes of the present invention is silica, such as, for example, the commercially available silica grade marketed under the trade marks "GRACE 948" and "CROSSFIELD HP39".

Before being used in the process according to the present invention, such a silica, as also the other mentioned porous oxides, is preferably submitted to drying in order to eliminate most water adsorbed in its surface. Such a drying can be carried out, for example, at temperatures comprised within the range of from 150° to 800° C., under vacuum or under a nitrogen or dry air stream, for time periods usually comprised within the range of from 1 to 5 hours. The drying process also determines the concentration of surface OH groups, which can be thus adjusted, by varying drying time and temperature values, to the desired value, within the previously mentioned range.

The (b) step of the process according to the present invention comprises the reaction of M"$C_p$ salt, as previously defined, with the porous inorganic carrier (M' oxide) halogenated according to the above (a) step. The $C_p$ cyclopentadienyl anion replaces the chlorine (or bromine) atom on oxide surface, with thus releasing the corresponding chloride. In such a way, a compound containing a cyclopentadienyl ring is chemically bonded to the carrier by a covalent bond between a carbon atom of said cyclopentadienyl ring and an M' atom of the oxide. The position of the bonded carbon atom is not critical and can be any of the five available positions on cyclopentadienyl ring (however said position should not be already substituted by another group bonded to the ring).

The Cp cyclopentadienyl anion in the (b) step is the precursor of the A group of the supported metallocene of Formula (I). Thus, it should have the same molecular backbone as of the A group in the metallocene which one desires to obtain by means of the process according to the present invention. As previously stated on defining the A group, $C_p$ preferably is an anion derived (formally by extraction of a H⁺ ion) from a molecule of cyclopentadiene, indene or fluorene, or from a derivative of one of the above said compounds, wherein one or more carbon atoms of the molecular backbone (included or not in cyclopentadienyl ring), are substituted by $C_{(1-8)}$-alkyl or silylalkyl groups, or $C_{(6-10)}$-aryl or aryloxy, or $C_{(1-8)}$-alkoxy. Particularly preferred $C_p$ groups are ($C_5H_5$) cyclopentadienyl, ($C_9H_7$)-indenyl, and their (poly)methyl-substituted derivatives.

The (b) step of the instant process is advantageously carried out at temperatures comprised within the range of from 0° to 50° C., preferably at room temperature, by mixing the halogenated porous carrier and the M"'$C_p$ salt in an inert solvent, preferably an aliphatic, cycloaliphatic or aromatic ether. Particularly preferred as the inert solvent is tetrahydrofuran (THF).

The reaction generally requires from 1 to 48 hours to go to completion, as a function of the reaction conditions and of the reactivity of the reactants. Preferably, the reaction times are comprised within the range of from 8 to 24 hours.

The salts of formula M"Cp can be easily prepared according to any of the methods known from the known art, such as, for example, those described by G. Wilkinson in "Journal of American Chemical Society", Vol. 76 (1954), pages 4281–4284, the content of which is incorporated hereto by reference.

In general, the (b) step of the process according to the present invention is carried out by operating with a molar excess of M"$C_p$ salt, based on chlorine gram-atoms present on the surface of the porous carrier (which can be determined by titration by known methods). Preferably, the $C_p$/Cl molar ratio is comprised within the range of from 2:1 to 5:1.

The Cp groups concentration so bonded to the surface of the porous oxide is not easily experimentally determined, but one can suppose that it is approximately equal to the concentration of the initially present M'—OH groups, with both reactions in (a) and (b) steps of the instant process being substantially carried out until complete replacement of —OH groups and halogen radicals, respectively, on solid carrier is obtained.

The (c) step of the instant process comprises forming the supported metallocene on porous oxide by causing the supported $C_p$ groups to react with a metal M compound having the above formula (II).

Metal M preferably is Ti or Zr.

As already defined for compounds of Formula (I), the corresponding R' and R" groups in Formula (II) can represent, each independently, a hydrogen atom or a halogen atom, such as chlorine or bromine, a $C_{(1-8)}$-alkyl group such as, for example, methyl, ethyle, butyl, isopropyl, isoamyl, octyl, benzyl, a $C_{(3-12)}$-alkylsilyl group such as, for example, trimethylsilyl, triethylsilyl, or tributylsilyl, a cycloalkyl group such as cylopentyl or cyclohexyl, a $C_{(6-10)}$-aryl group, such as phenyl or toluyl, a $C_{(1-8)}$-alkoxy group such as, for example, methoxy, ethoxy, iso- or sec.-butoxy, or furthermore, a $C_{(2-10)}$-dialkylamide group or $C_{(4-20)}$-alkylsilylamide group, preferably of the type which can be represented by the general formula —NR⁴R⁵ wherein R⁴ and R⁵ are alkyl groups having from 1 to 4 carbon atoms, such as, for example, methyl, ethyl or butyl groups, or, in the case of alkylsilylamides, alkylsilyl groups having from 3 to 6 carbon atoms, such as, for example, trimethylsilyl or triethylsilyl.

Preferably, R' and R" groups of Formula (II) represent an alkoxy or a dialkylamide group of formula —$NR^4R^5$, with the latter being particularly preferred.

According to the present invention, R'" in Formula (II), can have any of the previously reported meanings for R' and R" groups, or can be a group containing an $\eta^5$-cyclopentadienyl ring coordinated to metal M. Preferably, R'" represents a dialkyalmide group or an alkoxy group, or an anion containing an $\eta^5$-cyclopentadienyl ring which preferably is derived (formally by extraction of an $H^+$ ion) from a molecule of cyclopentadiene, indene or fluorene, or from a derivative of one of the above said compounds, wherein one or more carbon atoms of the molecular backbone (which may be included or not in the cyclopentadienyl ring) are substituted with $C_{(1-8)}$-alkyl or silylalkyl groups, or $C_{(6-10)}$-aryl or -aryloxy or $C_{(1-8)}$-alkoxy.

According to a preferred embodiment of the process of the present invention, the R', R" and R'" groups of the compound of Formula (II) used in the (c) step, all represent dialkylamide groups of formula —$NR^4R^5$, and preferably are the same, such as, for example, dimethylamide or diethylamide groups.

According to a second preferred embodiment of the present invention, R' and R" also are dimethylamide or diethylamide groups, and R'" is a second group $\eta^5$-cyclopentadienyl group coordinated to metal M, having the structure of ($C_5H_5$)-cyclopentadienyl, ($C_9H_7$)-indenyl or a (poly)methyl-substituted derivative thereof.

B groups in Formula (II), suitable for the purposes of the present invention, are, for example, $C_{(1-8)}$-alkyl groups such as methyl, ethyl, butyl, isopropyl, isoamyl, octyl, benzyl, cycloalkyl groups such as cyclopentyl or cyclohexyl, or furthermore, $C_{(2-10)}$-dialkylamide groups, preferably of the type which can be represented by the general formula —$NR^4R^5$ wherein $R^4$ and $R^5$ are alkyl groups having from 1 to 4 carbon atoms, such as, for example, methyl, ethyl or butyl groups. Preferred B groups are dimethylamide and diethylamide.

Specific preferred compounds of Formula (II) for the purposes of the present invention are, for example: $Zr(NEt_2)_4$; ($\eta^5$-$C_5H_5$)$Zr(NEt_2)_3$; $Zr(NMe_2)_4$; ($\eta^5$-$C_5H_5$)$Ti(NMe_2)_3$; $Zr(NMe_2)_4$; ($\eta^5$—Ind)$ZrCl_2(NEt_2)$; $HfCl_3(NEt_2)$; $ZrCl_3(NEt_2)$; ($\eta^5$-$C_5H_5$) $TiCl_2(NMe_2)$; ($\eta^5$-$C_5H_5$)$TiMe_3$; ($\eta^5$—Ind)$ZrBz_3$.

In the preceding formulae, the abbreviations have the same meaning as previously reported for the specific compounds of Formula (I).

The compounds falling within the purpose of Formula (II) are generally known and can be easily prepared by means of any of the well-known methods of organometallic chemistry as reported, for example, in "Comprehensive Organometallic Chemistry", by G. Wilkinson et al. Editors, volume 3 (1982), pages 298–615. A large number of amide derivatives of Formula (II) can be prepared as reported by G. Chandra et al. in "J. of Chemical Soc." section A, (1968), pages 1940–1945. Other methods for preparing amide derivatives of Formula (II) are reported in European Patent Application No. EP-A-476 671. The content of the above said papers is incorporated to the present disclosure by reference.

According to the present invention, the (c) step can be advantageously carried out in a liquid medium constituted by a hydrocarbon solvent, preferably an aromatic hydrocarbon solvent, by allowing the functionalized porous oxide to stay into contact with the cyclopentadienyl groups [obtained according to (b) step] and the compound having Formula (II), at a temperature comprised within the range of from 70° to 150° C., preferably comprised within the range of from 90° to 130° C., and for a period time comprised within the range of from 4 to 12 hours. Particularly preferred aromatic solvents are toluene or xilenes.

The ratios of the reactants to each other, which can be used for carrying out the (c) step of the instant process, are determined as a function of the desired metallocene concentration on the carrier. Selecting such ratios is within the capabilities of those having an average skill in the art, by using the compound of Formula (II) in a molar excess relatively to the molar amount of Cp groups on the carrier, if one wishes to cause the latter to completely react whilst a lower-than-stoichiometric amount of the compound (II) will be used if one wishes that the end concentration of supported metallocene remains at a lower level. The reaction of formation of supported metallocene is generally quantitative. A strong excess of compound of Formula (II) is however unadvisable in order to avoid undesired adsorption phenomena.

Preferably, the molar ratio of Cp groups on the carrier to compound of Formula (II) is comprised within the range of from 0.5 to 2.0.

According to the process of the present invention, there is no need for carrying out a preliminary metallation of the $C_p$ group before carrying out the reaction with the compound of Formula (II), as, on the contrary, the inventors teach in the above cited Japanese Patent Application publication No. 5-17515. On the contrary, during the preliminary experiments carried out by the present Applicant, it was observed that such a metallation, if carried out, does not allow the support metallocenes having the desired properties, as of those of the present invention, to be obtained. We believe in fact that said preliminary metallation would cause a considerable amount of Cp groups, covalently bonded to the carrier, to be lost, with the potential activity of the solid catalyst component being consequently reduced too.

Without wishing that the scope of the present invention is limited by any particular theory, we believe that the B group of Formula (II) should have (when considered in its anionic form) such an alkaline character as it is sufficient in order to at least extract, under the same conditions as those used for carrying out the (c) step, a hydrogen ion from the Cp group bonded to the surface of porous oxide.

The supported metallocene obtained as described above can be subsequently recovered by removing the liquid medium, preferably by decantation of filtering, or it can be used as such in suspension in the same liquid medium. An effective washing of the supported metallocene is usually advisable when one desires to avoid any subsequent interferences by possibly present compounds different from those falling within the scope of Formula (I), which contain metal M and can be active during the polymerization.

According to the present invention, an organic aluminum oxy-derivative is used which usually is an aluminoxane, as the co-catalyst, in combination with the solid component constituted by the above described supported metallocene of Formula (I). The above said two components, when combined in the appropriate proportions, constitute a catalyst for the (co)polymerization of ethylene and other alpha-olefins.

As it is well-known, the aluminoxanes are compounds containing Al—O—Al bonds, with variable O/Al ratio, which can be obtained in the art by means of the reaction, under controlled conditions, of an alkylaluminum, or alkylaluminum halide, with water or other compounds containing controlled amounts of available water, such as, for example, in the case of trimethylaluminum, with a hydrous salt, such as aluminum sulfate hexahydrate, copper sulfate pentahydrate and iron sulfate pentahydrate. The aluminoxanes which are preferably usable for the formation of the polymerization catalyst of the present invention are cyclic or linear, oligo- or polymeric compounds, characterized by the presence of repeating units of formula:

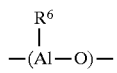

wherein $R^6$ is a $C_{(1-4)}$-alkyl group, preferably methyl or ethyl.

Preferably, each aluminoxane molecule contains from 4 to 70 repeating units which may even be not all equal to each other, but, on the contrary, they can contain different $R^6$ groups.

In particular, in the alpha-olefins polymerization catalysts according to the present invention the aluminoxane and the solid component are used in such amounts that the atomic ratio of aluminum in aluminoxane to metal M in the supported metallocene of Formula (I) is comprised within the range of from 10 to 10,000 and preferably of from 100 to 5,000.

The catalysts according to the present invention are useful in ethylene polymerization to yield linear polyethylene and in propylene or higher alpha-olefins polymerization to yield atactic, syndiotactic or isotactic polymers as a function of the specific polymerization conditions and of the alpha-olefin itself. The catalytic systems are also active in ethylene (co)polymerization with propylene and/or other olefins for obtaining in particular LLDPE, VLDPE and ULDPE, with low alpha-olefin contents, and EPR rubbers with high alpha-olefin contents. Furthermore, they can be used for ethylene, propylene and diene terpolymerization in order to obtain vulcanizable EPDM rubbers.

The catalysts according to the present invention can be used with very good results in substantially all of the known polymerization processes, such as, for example, suspension polymerization processes under medium or high pressure conditions and at temperatures comprised within the range of from 50° to 240° C.; in polymerization processes carried out in solution in an inert eluent, operating under pressures comprised within the range of from 10 to 150 bars and at temperatures comprised within the range of from 120° to 230° C.; or in gas phase polymerization processes, at temperatures generally comprised within the range of from 60° to 160° C., under pressures comprised within the range of from 5 to 50 bars. As the molecular weight regulator agent, hydrogen is usually used. In all cases, the catalysts according to present invention are characterized by high stability and activity, thus allowing polylolefins with high molecular weight, controlled granulometry values and free from fine powders, to be obtained.

The present invention is illustrated in detail by the following examples, which, however, are reported for only indicative purposes and shall not be construed as being limitative of the overall perview of the present invention.

The inorganic oxide which is used in the examples as the carrier particle, is constituted by a commercial silica of "Grace 948" type, having an average granulometry of 55 μm, which was preliminarily treated during 5 hours at 500° C. under vacuum, and was subsequently handled under an inert nitrogen atmosphere. The so treated silica has a residual content of —OH hydroxide groups of 0.82 mmol/g.

Tha amount of metallocene complex chemically bonded to silica surface in the solid catalyst component of the present invention is measured by measuring the concentration of the transition metal (in particular titanium or zirconium), by X-ray fluorescence, using a Philips PW 1404/10 Sequential Spectrometer. The determination was carried out in accordance with the methodology reported by M. Thomson and J. M. Walsh in "A Handbook of Inductively Coupled Plasma Spectrometry", Blackie Ed. (Glasgow and London), page 105, the content of which is incorporated in the present patent application by reference.

The infrared spectroscopy determinations mentioned in the following examples were carried out by using a Perkin Elmer 1800 FTIR spectrometer.

The characterization by $^{13}C$ NMR spectroscopy was carried out on a Bruker MSL-200 Nuclear Magnetic Resonance Spectrometer for the solid state.

EXAMPLE 1

(a) Step: Silica Chlorination 10 g of silica having the previously specified characteristics is charged to a quartz ampoule equipped with a porous diaphragm at one of its ends, and is heated up to 450° C. under a nitrogen atmosphere. While keeping silica at such a temperature value, a stream of nitrogen gas saturated with carbon tetrachloride ($CCl_4$) vapours obtained by bubbling nitrogen in liquid $CCl_4$ at room temperature, is then caused to flow through the ampoule, under approximately atmospheric pressure. After 5 hours the silica surface results to be completely chlorinated, as demonstrated by the disappearance of the band generated by the OH group in the infrared spectrum of a sample of silica collected from the ampoule. The molar concentration of chlorine atoms bonded on the surface of the silica is thought to be approximately equal to that of OH groups present prior to chlorination. The so obtained chlorinated silica is cooled down to room temperature and is kept under an inert atmosphere.

(b) Step: silica functionalization with cyclopentadiene 20 ml of a 0,5M solution of cyclopentadienylsodium ($NaC_5H_5$) in tetrahydrofuran (10 mmol of $NaC_5H_5$) is added dropwise, under an inert atmosphere, to a glass ampoule containing 4.9 g of chlorinated silica obtained as described above (about 4 mmol of Si—Cl groups) suspended in 140 ml of THF and kept with slow magnetic stirring. At the end of the dropwise addition, the solution is kept stirred at room temperature for 24 hours, and then is filtered and washed more times with THF. The so obtained solid material is dried under vacuum and is characterized by $^{13}C$ NMR spectroscopy by means of which the presence of the peak at 44 ppm, characteristic of cyclopentadiene bonded to a silicon atom, is evidenced. Thus, one can conclude that the obtained solid material is characterized by the presence of cyclopentadiene groups covalently bonded to the silicon atoms present on the silica surface.

(c) Step: preparation of supported metallocene

Inside a glass reaction flask, 3 g of silica functionalized with cyclopentadiene prepared as described above is suspended in 40 ml of toluene, operating under an inert atmosphere. 2.5 ml of tetrakis-diethylamino zirconium [$Zr(NEt_2)_4$, 6.78 mmol] is added and the resulting mixture is heated up to toluene refluxing temperature. The mixture is then kept refluxing for 6 hours, with slow stirring. The mixture is cooled down to room temperature and the resulting suspended solid product is filtered off and then is washed three times with toluene and once with pentane.

The solid obtained after drying under vacuum resulted to contain 3.62% by weight of zirconium (corresponding to 0.397 mmol/g), as determined by X-ray fluorescence. The $^{13}C$ NMR spectrum of the obtained product contains the expected peaks at 13 ppm of the amide methyl, and at about 48 ppm of amidic methylene, besides the multiplet at 80–160 ppm, characteristic of carbon atoms of cyclopentadienyl coordinated to zirconium. This confirms that a zirconium metallocene complex is obtained, which can be represented by the formula:

$(Si_{silica})\text{—}(\eta^5\text{-}C_5H_5)Zr(NEt_2)_3$ wherein the "$(Si_{silica})\text{-}(\eta^5\text{-}C_5H_5)$" term represents an $\eta^5$-cyclopentadienyl anion in which a ring carbon atom is bonded to a silicon atom of silica surface.

EXAMPLE 2

A catalyst solid component is prepared by operating following the same procedure and using the same reactants as of the preceding Example 1, except for using, in (c) step, 2.1 g of the same silica functionalized with cyclopentadiene and 0.3 ml of $Zr(NEt_2)_4$ (0.79 mmol). The so obtained solid resulted to contain 2.72% by weight of zirconium (0.298 mmol/g) and it showed a substantially analogous $^{13}C$ NMR spectrum to that of the solid component prepared according to Example 1.

EXAMPLE 3

For the preparation of a titanium-based supported metallocene, the same process as described in (c) step of Example 1 was repeated, but using tetrakis (dimethylammonium) titanium [$TiNMe_2)_4$] in place of the corresponding zirconium complex. For such a purpose, 1.0 g of the same silica functionalized with cyclopentadiene obtained in Example 1, and 200 mg (0.9 mmoles) of $Ti(NMe_2)_4$ were used. At the end of the preparation a solid catalyst component was obtained which resulted to contain, after vacuum drying, 2.17% by weight of titanium (corresponding to 0.453 mmol/g), as determined by X-ray fluorescence. The $^{13}C$ NMR spectrum of the resulting product confirms that a titanium metallocene complex was obtained, which can be represented by the formula:

$(Si_{silica})\text{-}(\eta^5\text{-}C_5H_5)Ti(NMe_2)_3$ wherein the "$(Si_{silica})\text{-}(\eta^5\text{-}C_5H_5)$" term has the same meaning as of the corresponding term in Example 1.

EXAMPLE 4

A solid catalyst component is prepared by operating by following the same procedure as of preceding Example 1, except for using 1.3 g of the same silica functionalized with cyclopentadiene and 250 mg of $(\eta^5\text{-}C_5H_5)Ti(NMe_2)_3$ (1.0 mmol). At the end of the preparation a catalyst solid component was obtained which resulted to contain, after vacuum drying, 2.48% by weight of titanium (corresponding to 0.518 mmol/g), as determined by X-ray fluorescence. The $^{13}C$ NMR spectrum of the obtained product contained the expected peaks at 36 and 48 ppm of amidic methyls, and both peaks centered at 112 and 128 ppm generated by cyclopentadienyl carbon atoms coordinated to titanium. This result confirms that a titanium metallocene complex is obtained, which can be represented by the formula:

$(Si_{silica})\text{-}(\eta^5\text{-}C_5H_5)Ti(\eta^5\text{-}C_5H_5)(NMe_2)_2$ wherein the term "$(Si_{silica})\text{-}(\eta^5\text{-}C_5H_5)$" has the same meaning as of the corresponding term in Example 1.

EXAMPLE 5 (Polymerization)

To a BUCHI autoclave with a 0.5 l glass reactor, equipped with magnetic driven stirring means, 250 ml of anhydrous toluene and 6.5 ml of a 10% by weight solution of methylaluminoxane in toluene (WITCO) are charged. The temperature is increased up to 70° C. and a suspension, containing the catalyst solid component in 25 ml of toluene, is then added. After about 5 minutes, the autoclave is pressurized at 4 bar with ethylene and the contents are allowed to polymerize for 1 hour, with continuously adding ethylene so as to keep inner autoclave pressure at a constant value. At the end, the autoclave is vented and 1 l of methanol acidified with HCl is added in order to facilitate the separation of the formed polymer. The polymer is filtered and washed twice with acetone, and is then air dried for 24 hours and is finally weighed and characterized.

A plurality of polymerization were carried out according to the general method described above, and using the different supported metallocenes prepared as described in examples from 1 to 4. In following Table 1 the catalysts used (with reference to the number of example of preparation of the corresponding supported metallocene) and the amounts of each of them (as mmol of metal M present in the polymerization reactions), are reported. In the same table the yields obtained for each polymerization and the average molecular weight of the obtained polyethylene are reported.

TABLE 1

| Test N. | Catalyst (Ex. N.) | M (mmol. $10^3$) | Al/M | Yield (Pol. g/M mmol/h) | Average $M_n$ |
|---|---|---|---|---|---|
| I | 1 | Zr | 5.20 | 2500 | 437 | 167,000 |
| II | 2 | Zr | 1.15 | 2500 | 257 | 325,000 |
| III | 3 | Ti | 10.0 | 500 | 80 | 136,000 |
| IV | 4 | Ti | 1.20 | 2500 | 500 | n.d. |
| V | 4 | Ti | 10.00 | 500 | 80 | 226,000 |

In order to respect convention, moiety B in formula (II) above, will be defined in the claims, with the same definition as moiety B in the specification, as moiety G in order to avoid confusion with elemental boron.

We claim:

1. A solid catalyst component for the polymerization and copolymerization of ethylene and alpha-olefins, comprising a metallocene supported on an inorganic solid carrier constituted by a porous silicon oxide, said supported metallocene having the formula (I):

where M represents a metal selected from the group consisting of titanium, zirconium and hafnium;

A is an anion containing a $\eta^5$-cyclopentadienyl ring coordinated to said metal M;

R' and R" of the formula (I) are dialkylamide of the formula $—NR^4R^5$, wherein $R^4$ and $R^5$ are $C_{1-4}$ alkyl;

R'" is as defined for R' and R" and independent therefrom or a second anion containing a $\eta^5$-cyclopentadienyl ring coordinated to metal M;

wherein a carbon atom of the $\eta^5$-cyclopentadienyl ring of anion A is covalently bonded to silicon on the surface of said inorganic solid carrier.

2. The solid catalyst component according to claim 1, wherein R', R" and R'" of formula (I) represent dialkylamide of the formula $—NR^4R^5$, wherein $R^4$ and $R^5$ are $C_{1-4}$ alkyl.

3. The solid catalyst component according to claim 2, wherein $R^4$ and $R^5$ are identical to each other.

4. The solid catalyst component according to claim 2, wherein R', R" and R'" of the formula (I) are identical and are selected from the group consisting of dimethylamide or diethylamide.

5. The solid catalyst component according to claim 1, wherein R'" is cyclopentadienyl, indenyl or a methyl-substituted compound of each.

6. The solid catalyst component according to claim 1, wherein $R^4$ and $R^5$ are identical to each other.

7. The solid catalyst component according to claim 1, wherein metal M in formula (I) is selected from the group consisting of titanium and zirconium.

8. The solid catalyst component according to claim 1, wherein said porous silicon oxide is in granular or powder form with an average granulometry within the range of from about 0.1 to 500 μm.

9. The solid catalyst component according to claim 8, wherein said porous silicon oxide is in granular or powder form with an average granulometry within the range of from about 5 to 200 μm.

10. The solid catalyst component according to claim 1, wherein the metallocene is selected from the group consisting of compounds having the following formulae:

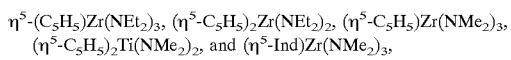
$\eta^5$-($C_5H_5$)Zr($NEt_2$)$_3$, ($\eta^5$-$C_5H_5$)$_2$Zr($NEt_2$)$_2$, ($\eta^5$-$C_5H_5$)Zr($NMe_2$)$_3$, ($\eta^5$-$C_5H_5$)$_2$Ti($NMe_2$)$_2$, and ($\eta^5$-Ind)Zr($NMe_2$)$_3$, each compound having one hydrogen atom, on a carbon atom in an $\eta^5$-cyclopentadienyl ring, substituted with a covalent bond to a silicon atom of the porous carrier.

11. The solid catalyst component according to claim 1, wherein the metal M concentration on said porous silicon oxide is within the range of from about 0.1 to 10% by weight, with reference to the weight of said solid component.

12. The solid catalyst component according to claim 11, wherein the metal M concentration on said porous silicon oxide is within the range of from about 0.5 to 5% by weight, with reference to the weight of said solid component.

13. A process for preparing the solid catalyst component according to claim 1, commencing with a porous silicon oxide on the surface of which —OH groups are present, which process comprises the following subsequent steps:

a) halogenating said porous silicon oxide until disappearance of the characteristic IR peak at about 3750 cm$^{-1}$, thereby replacing the —OH groups bonded to silicon with halogen atoms selected from the group consisting of chlorine and bromine;

b) contacting, in an inert liquid medium, the halogenated porous silicon oxide, produced in step a), with a salt having the formula M"Cp, wherein M" is an alkali metal, and Cp represents a substituted or unsubstituted cyclopentadienyl group containing anion, until the replacement of said halogen atoms is obtained, on the surface of said porous silicon oxide, with said Cp groups, in which a carbon atom of the cyclopentadienyl ring is covalently bonded to a silicon atom of the porous oxide; and c) reacting said Cp groups bonded to the surface of said porous silicon oxide with a metal M compound having the following formula (II):

wherein R', R", R'" and M have the same meaning as in formula (I) of claim 1, and C is $C_{1-8}$-alkyl, $C_{5-8}$-cycloalkyl, $C_{6-10}$-aryl, $C_{1-8}$-alkoxy or $C_{1-10}$-dialkylamide, thereby forming the supported metallocene having the formula (I) of claim 1.

14. The process according to claim 13, wherein said porous silicon oxide in step a) has a granulometry within the range of from about 0.1 to 500 μm, a pore volume within the range of from about 1 to 3 ml/g, an available surface area within the range of from about 50 to 400 m$^2$/g, and a concentration of —OH groups on its surface within a range of from about 0.1 to 2.0 mmol/g.

15. The process according to claim 14, wherein said porous silicon oxide in step a) has a granulometry within the range of from about 5 to 200 μm, an available surface area within the range of from about 100 to 300 m$^2$/g and a concentration of —OH groups on its surface within the range of from about 0.4 to 1.0 mmol/g.

16. The process according to claim 13, wherein in step a), said porous silicon oxide is reacted with vapors of a chlorinating agent selected from the group consisting of $CCl_4$, $Cl_2$, $SiCl_4$ and HCl, at a temperature within the range of from about 300° to 600° C. and for a time sufficient to carry out the replacement of the —OH groups by chlorine atoms.

17. The process according to claim 13, wherein in step b), Cp is a cyclopentadienyl anion derived formally by removal of an H$^+$ ion from a molecule of cyclopentadiene, indene or a methyl-substituted compound of each.

18. The process according to claim 13, wherein said step b) is carried out at a temperature within the range of from about 0° to 50° C., in an aliphatic, cycloaliphatic or aromatic ether, with a molar ratio of Cp/halogen within the range of from about 2:1 to 5:1.

19. The process according to claim 18, wherein said step b) is carried out at about room temperature in tetrahydrofuran.

20. The process according to claim 13, wherein in the compound of formula (II), C, R', R" and R'" represent dialkylamide of the formula —NR$^4$R$^5$, wherein R$^4$ and R$^5$ are $C_{1-4}$ alkyl.

21. The process according to claim 20, wherein said R$^4$ and R$^5$ are identical to each other.

22. The process according to claim 20, wherein said C, R', R" and R'" are dimethylamide or diethylamide.

23. The process according to claim 20, wherein R'" is cyclopentadienyl, indenyl or a methyl substituted compound of each.

24. The process according to claim 13, wherein said step c) is carried out in toluene, at a temperature within the range of from about 70° to 150° C., and for a period of time within a range of from about 4 to 12 hours.

25. The process according to claim 24, wherein said step c) is carried out at a temperature within the range of from about 90° to 130° C.

26. The process according to claim 24, wherein the molar ratio of Cp groups on the carrier to the compound of formula (II) in step c) is within the range of from about 0.5 to 1.0.

27. A catalyst for the polymerization and copolymerization of ethylene and alpha-olefins, comprising said solid catalyst component according to claim 1, in combination with an organic aluminum oxy- derivative compound, with an atomic ratio of aluminum to said metal M in the supported metallocene of the formula (I) in claim 1, within the range of from about 10 to 10,000.

28. The catalyst according to claim 27, wherein said organic aluminum oxy-derivative compound is an aluminoxane.

29. The catalyst according to claim 27, wherein said atomic ratio of aluminum to said metal M in the supported metallocene is within a range of from about 100 to 5,000.

* * * * *